United States Patent Office 3,008,226
Patented Nov. 14, 1961

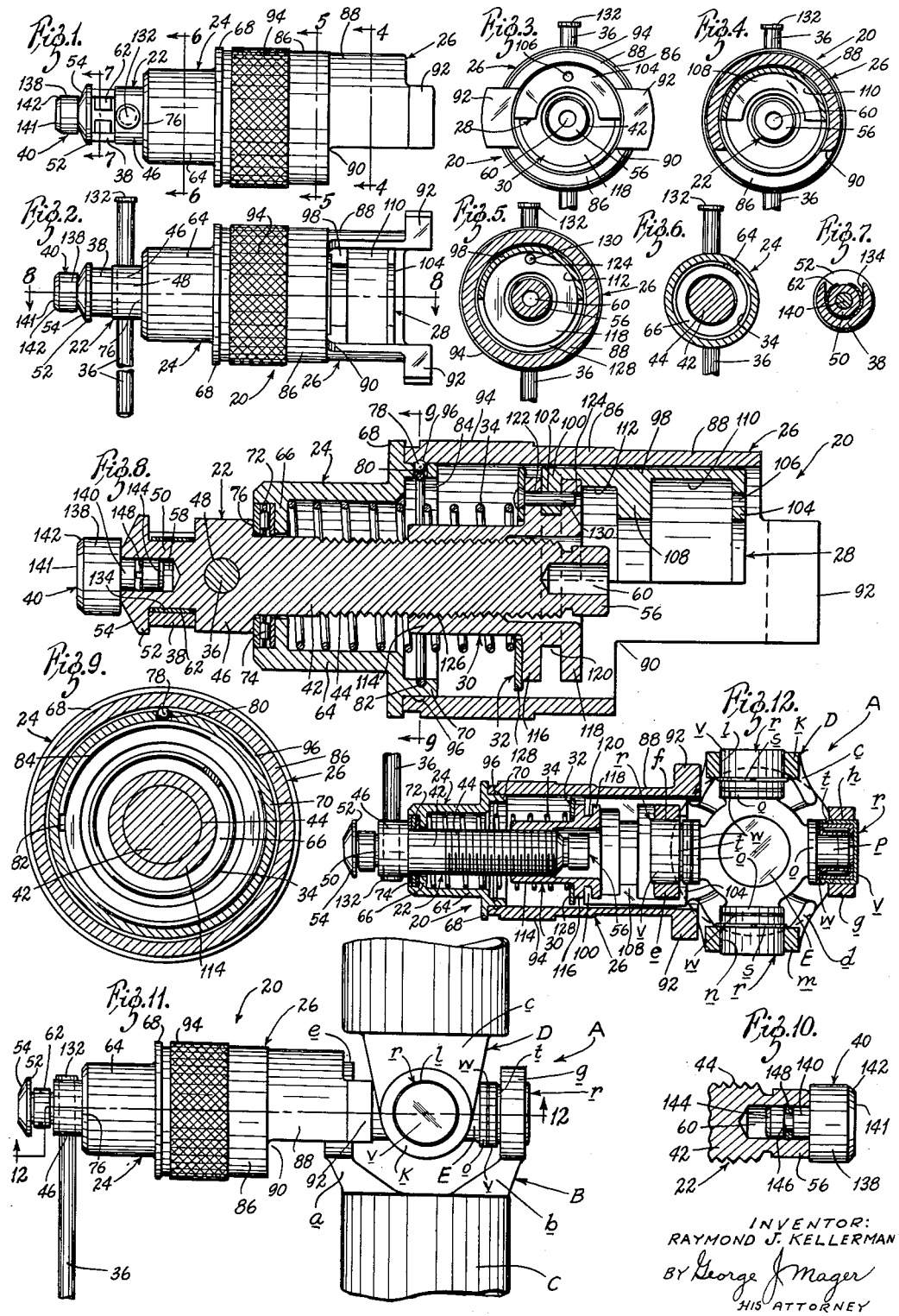

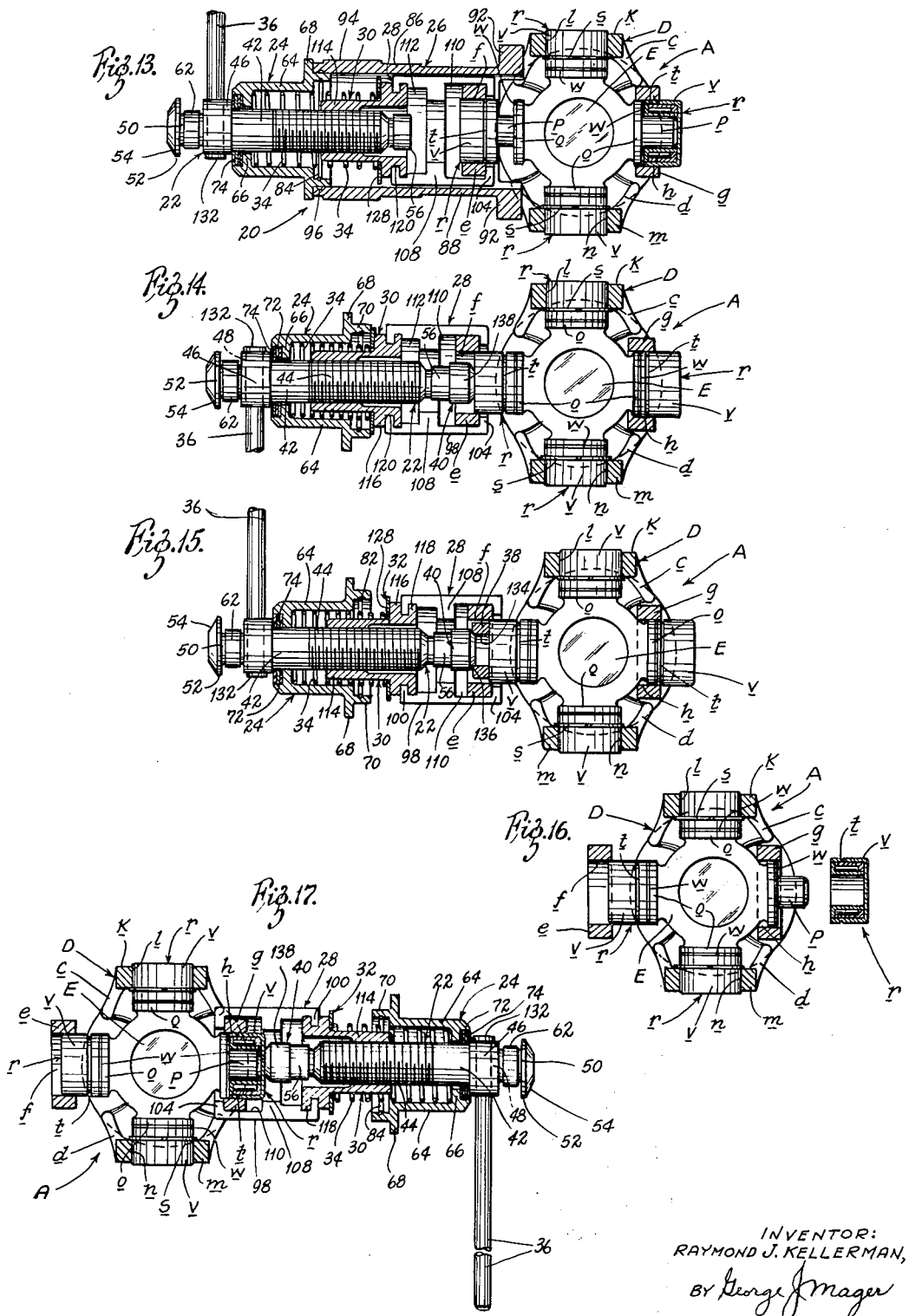

3,008,226
DEVICE FOR REMOVING AND REPLACING UNIVERSAL JOINT BEARINGS
Raymond J. Kellerman, University City, Mo., assignor to Uni-Matic, Inc., St. Louis, Mo., a corporation of Missouri
Filed Feb. 1, 1960, Ser. No. 5,994
7 Claims. (Cl. 29—201)

The present invention relates generally to tools of the type employed by mechanics in the repair of automotive vehicles and the like. More particularly, the present invention relates to a novel and improved device for removing and replacing the needle bearing assemblies of universal joints of propeller shaft assemblies.

Although as is understood, the disassembling of universal joints is not frequently required, there are times when such operations do become necessary for various reasons. Thus for example, some manufacturers of automotive equipment recommend that the needle bearing assemblies be removed, cleaned, and lubricated every 10,000 miles, others recommend this operation every 20,000 miles. In order to accomplish this, it is of course necessary that the bearing assemblies aforesaid be removed from the journals of the cross or spider included in a universal joint. Prior to the present invention, this constituted not only a tedious operation, but also usually resulted in an unsatisfactory final result.

In other words, the bearings of the type under consideration comprise needle bearings assembled and appropriately retained within a metallic cup. The cups, with the needle bearings disposed circularly about the spider journals, are press fitted into circular openings provided therefor in the free ends of a pair of arms included in the yoke members of the joint. Each cup is provided with an annular external groove for the reception of a split lock ring to insure against possibility of the bearing assembly being dislodged even under extremely unfavorable road conditions.

Heretofore insofar as I am aware, removal of these needle bearing assemblies comprised a difficult and time-consuming operation. That is to say, following removal of the locking rings, one needle bearing assembly would customarily be pushed toward the spider by directing a succession of hammer blows against a punch held in contact with the bearing cup, until the opposite needle bearing assembly was forcibly ejected from the yoke and thus removed. Thereafter, with the punch in contact with the then exposed spider journal, a succession of hammer blows in the reverse direction would be administered to force out the opposite bearing assembly. After the bearings had been cleaned and lubricated, the assemblies would again be driven in place by means of hammer blows directed against the cups.

Obviously, in consequence of these operations, irreparable damage had been frequently sustained. Thus a misdirected hammer blow could, and usually would, result in a sprung yoke, or in the deformation of a bearing assembly. Inasmuch as the propeller shaft and universal joint constructions are dynamically balanced at the time of manufacture, a damaged universal joint will result in "noisy" operation.

Accordingly, the principal object of the present invention is to provide a novel device adapted to overcome the disadvantages referred to above.

To this end, the invention provides a manually operable tool including means for removing needle bearing assemblies without damage thereto, without damage to yokes, to the spider member, or to the spider journals of a universal joint. The tool further includes means adapting its use to various sized universal joints of automotive equipment.

In some instances, by means of the present invention, the removal and replacement of needle bearing assemblies may be accomplished without disconnecting the propeller shaft assembly from the vehicle.

The invention is illustrated on two sheets of drawings that accompany this specification, and a more comprehensive understanding of the features and advantages inherent therein may be had from the detailed description that follows with reference to said drawings. It will be understood whenever employed hereinafter, that terms such as "left," "right," "vertical," "horizontal," "upper," "lower" and so on, have reference to parts as viewed in the drawings, and have been adopted in the interest of descriptive clarity only. That is to say, inasmuch as in use the mechanism comprising the present invention may be disposed vertically, horizontally, or angularly as the case may require, the above noted and any directional terms employed hereinafter are not to be considered in a limiting sense.

FIGURE 1 is a plan view of the device comprising the present invention, the various elements thereof being nested in assembled relation as when the device is not in use;

FIGURE 2 is a side elevational view of the device illustrated in FIGURE 1;

FIGURE 3 is a right end elevational view of FIGURE 1;

FIGURES 4, 5, 6 and 7 are transverse sectional views taken respectively on the lines 4—4, 5—5, 6—6, and 7—7 of FIGURE 1;

FIGURE 8 is a longitudinal sectional view, on an enlarged scale, taken axially of the assembled device along the line 8—8 of FIGURE 2;

FIGURE 9 is a transverse sectional view taken on the line 9—9 of FIGURE 8;

FIGURE 10 is a fragmentary sectional view illustrating the extension element therefor removably inserted in the leading end portion of an arbor included in the device;

FIGURE 11 is a plan view of a typical automotive vehicle universal joint, illustrating the initial application of the instant device thereto preparatory to removing one of a pair of opposed needle bearing assemblies from the spider journals of said joint;

FIGURE 12 is a vertical sectional view, partly in elevation, taken along the line 11—11 of FIGURE 10, the operating handle bar of the device being exemplarily shown in a position removed one half a revolution from the position it occupies in FIGURE 10;

FIGURE 13 is a view similar to FIGURE 12 illustrating the disposition of the various parts when the right hand needle bearing assembly has been partially exposed;

FIGURE 14 is a view similar to FIGURE 13, with the spacing sleeve of the device removed, and with the arbor extension in place, this view illustrating the disposition of the various parts when the right hand needle bearing assembly has been further exposed;

FIGURE 15 is a view similar to FIGURE 14 illustrating the final operation wherein, with the aid of a C-shaped spacer element, said right handle needle bearing assembly has been moved to a position wherein ready manual removal thereof may be had;

FIGURE 16 is a view similar to FIGURE 15, the device of the present invention having been removed and the bearing assembly aforesaid having been manually extracted; and FIGURE 17 is a sectional view illustrating the manner wherein the bearing assembly, having been cleaned and lubricated, would be pressed into place within the bearing opening wherefrom it had been removed.

The manually operable device comprising the present invention is designated generally by the numeral 20. Said device includes the following major components or elements: an arbor 22; a cup member 24; a spacer sleeve 26; a jaw member 28; a jaw actuating cylinder 30; a jaw locking assembly 32; a compression spring 34; an operating handle bar 36; a spacer element 38; and what will be termed an arbor extension 40. Associated with and complementally disposed relatively to the above-identified major components are various other elements to be described.

The arbor 22 as best seen in FIGURE 8, includes a cylindrical main body 42 provided with peripheral threads 44 as shown. Near the outer end thereof, said body merges into a larger diametered collar portion 46 having a diametrical circular opening 48 therein through which the operating handle bar 36 extends. Said collar portion 46 merges into a reduced cylindrical segment designated 50, and the segment 50 in turn merges into a circular flange 52. Preferably, the outer face 54 of the flange 52 has a beveled contour as shown. At its inner end, the arbor 22 terminates in a cylindrical collar segment 56, the diameter of which is slightly reduced relatively to the threaded portion of the main body 42. An axial circular recess or socket 58 is formed in the outer end of the arbor, and a similar recess or socket 60 is provided in the inner end thereof for reasons to appear. Surrounding the cylindrical segment 50 is a resilient split ring 62, the internal diameter thereof being slightly larger than the external diameter of said segment.

The cup member 24 includes a cylindrical wall 64, an inwardly extending annular flange 66, an outwardly projecting circular flange 68, and an annular flange 70 that projects laterally from the flange 68 as shown. The disposition of the flange 66 is such as to provide an annular recess 72 in the cup member, there being an appropriate needle type thrust bearing assembly 74 interposed between said flange and the annular shoulder 76 of the arbor collar portion 46, as shown particularly in FIGURE 8.

Numeral 78 designates a detent in the form of a ball element that is movably but retainedly disposed in a radial opening 80 provided therefor in the flange 70. Seated in a circular groove 82 provided in the internal periphery of said flange 70, is an expander spring 84. This expander spring is split and exerts its force against the ball detent 78 to bias it outwardly as is understood.

The spacer sleeve 26 is generally cylindrical and includes a main body portion designated 86, and an arcuate extension designated 88 that is integral therewith. As shown in the drawings, the extension 88 is recessed as at 90 and terminates in a pair of diametrically opposed lug segments designated 92. A raised knurled band 94 is provided on the sleeve 26, whereby to facilitate manipulations of the device, as will be apparent. Formed in the internal periphery of said main body portion 86 of the sleeve 26 is an annular semicircular groove 96 adapted to be engaged by the ball detent 78, thus to releasably retain said sleeve in position on the flange 70 for a purpose to be explained.

The jaw member 28 is of semicircular contour viewed in end elevation. It includes a main body 98 terminating at each end in an inwardly extending semicircular flange, and having a similar intermediate flange. As viewed in FIGURE 8, the left hand end flange 100 of said jaw member has formed therein a circular opening designated 102. Similarly, and in alignment with said opening 102, the right hand end flange 104 has formed therein a circular opening 106. The intermediate flange 108 defines with said end flanges two spaced semicircular cavities in the jaw member 28. The first of these cavities is designated 110, and is somewhat wider than the second cavity designated 112.

The jaw actuating cylinder 30 includes a main body 114 merging at the right end into a pair of horizontally spaced outstanding circular flanges 116 and 118. Formed by the spaced flanges aforesaid is an annular peripheral groove 120 having a diameter corresponding to the internal diameter portions of the jaw flanges 100 and 104. Aligned circular openings 122 and 124 are provided in the flanges 116 and 118 respectively. As best seen in FIGURE 8, the openings 102 and 106 in the jaw member 24, and the openings 122 and 124 in the actuating cylinder 30 all have corresponding diameters. Interanlly, the main body 114 of the actuating cylinder is threaded for engagement with the arbor threads 44 as shown, this thread formation being indicated by the numeral 126.

The jaw locking assembly 32 includes a circular disc 128 provided with a concentric central opening that freely surrounds the main body 114 of the jaw actuating cylinder 30 as shown. Numeral 130 designates a lock pin rigidly secured at one end in the disc 128, as shown. The lock pin 130 projects laterally from the right face of said disc, and the diameter thereof is such as to slidably extend through the circular openings 102 or 106, 122 and 124. The jaw locking assembly 32 also includes the compression spring 34 that is interposed about the arbor 42 and the main body 114 of the actuating cylinder 30 between the flange 66 of the cup member 24, and the disc 128 of said assembly.

The operating handle bar 36 as previously noted, extends through the opening 48 in the arbor collar 46 and is slidable therein. One end of said bar is provided with a head 132 that ordinarily would rest against the arbor collar 46 when the device is in use, as illustrated in FIGURES 11 through 15.

The spacer element 38 is C-shaped as seen particularly in FIGURE 7. The major internal periphery 134 of the spacer 38 is formed on a radius that is slightly smaller than the diameter of the split ring 62 in the expanded or free status of the latter. Consequently as should be apparent, when the spacer is not in use, it may be snapped onto said ring about the cylindrical segment 50 of the arbor, and thus be retained thereon between the opposed faces of the collar portion 46 and the end flange 52. Preferably but not necessarily, one end face of the spacer 38 may be beveled slightly as indicated at 136 in FIGURE 15.

The arbor extension 40 comprises a plug insertably and removably retainable optionally in the socket 58, or in the socket 60. It includes a round head 138 integral with a shank 140 having a diameter corresponding to those of said sockets. The head 138 has a flat face 141 provided with a beveled peripheral edge 142. Intermediate the head 138 and the beveled end 144 of the shank 140, the latter has formed therein a peripheral groove 146 wherein is confined a split retainer ring 148. In its expanded status, the ring 148 has a slightly larger diameter than the shank 140, and consequently than the sockets 58 and 60, so that when the arbor extension 40 is pressed into either socket, the resiliency of said ring serves to retain said extension therein against fortuitous displacement.

Prior to presenting an explanation of the manner wherein the device 20 would be employed in attaining its objectives, a few general observations will be given. Thus, with respect to the arbor 22 when viewed from the left end in the drawings, clockwise rotary motion imparted thereto via the handle bar 36 will cause the actuating cylinder 30 to advance leftwardly against the biasing force of the compression spring 34. However, when the jaw actuating cylinder 30 is restrained from movement, clockwise rotation of the arbor 22 will cause said arbor together with the cup member 24 to advance rightwardly.

With respect to the needle bearing assembly 74 disposed in the annular recess 72 of the cup member 24, it is noted that rotation of the arbor 22 is greatly facilitated by the provision thereof. With respect to the spacer sleeve 26, it should be observed that the appropriate initial placement of the device is facilitated in consequence of the knurled band 94, inasmuch as the hands of the mechanic employing the device may be and usually are slippery. This knurled band also facilitates removal of the sleeve itself from its engagement by the ball detent 78.

With respect to the jaw member 28, it will be observed that the provision of the aligned circular openings 102 and 106 therein adapts said element for endwise reversal of the cavities 110 and 112. To release the jaw member from the position thereof illustrated in FIGURE 8, the sleeve 26 would be removed, followed by a manual leftward pull on the disc 128 exerted against the force of the compression spring 34. In this manner the pin 130 would be withdrawn from engagement with the openings 102 and 124, whereupon the jaw member 28 could be removed, reversed end for end, and then locked in place with the pin 130 extending through the openings 122, 106, and 124.

The beveled face 54 of the arbor flange 52 facilitates extraction of the extension plug 40 as should be apparent. The resilient split ring 62 provides an appropriate retaining means for the C-shaped spacer element 38 when it is not in use.

Operation

With attention directed primarily to FIGURE 11, what will be considered a top plan view of a typical universal joint herein contemplated, is illustrated and generally designated A. Included in this illustration are a first yoke B integrated with the end portion of a propeller shaft C leading from the vehicle differential mechanism, a second or slip yoke D leading from the transmission, and a cross or spider designated E. The yokes B and D are counterparts insofar as their construction is concerned, and each includes a pair of spaced arms having a circular opening therein for the retention of a needle bearing assembly press fitted thereinto as is customary.

In the interest of clarity, the above mentioned components and associated parts of the exemplary universal joint will be identified by means of reference characters. Thus the arm of the yoke B appearing at the left in FIGURE 11 is designated $a$, and the arm of said yoke appearing at the right is designated $b$. With reference also for example to FIGURE 12, the upper arm of the yoke D is designated $c$, and the opposite or lower arm is designated $d$. The circular bearing opening formed in the free end portion $e$ of the arm $a$ is designated $f$, the similar opening formed in the free end portion $g$ of the opposite arm $b$ is designated $h$. The bearing opening formed in the free end portion $k$ of the upper arm $c$ of the yoke D is designated $l$, and the similar opening in the free end portion $m$ of the opposite arm $d$ is designated $n$.

The typical cross or spider E illustrated includes a generally circular body portion provided with pairs of diametrically disposed annular shoulders $o$ that are arcuately spaced 90° apart in conventional manner. Integral with and projecting outwardly from each shoulder $o$ is a spider trunnion or journal $p$, only one of which is illustrated in most of the drawings, it being observed that two of them appear in FIGURE 13.

Surrounding and rotatably supporting each spider journal $p$ is a self-contained needle bearing assembly $r$ that is press fitted into one of the openings $f$, $h$, $l$ or $n$ as is understood. These bearing assemblies are locked in place by means of split retainer rings $s$ that seat in peripheral grooves $t$ provided therefor in the metallic cups $v$ wherein the needle bearings are contained. Customarily, a dust shield $w$ is interposed about each spider journal between the shoulder $o$ and the inner end of the associated needle bearing assembly $r$. Inasmuch as all of the universal joint components identified by means of alphabetical reference characters are of the well known conventional variety, it is not deemed necessary to further elaborate thereabout.

It will now be assumed that the mechanic has decided to remove the right hand needle bearing $r$ from the universal joint A. Consequently, he would first of all extract the snap rings $s$ that serve to lock the bearings $r$ in the openings $f$ and $h$ of the arm end portions $e$ and $g$ of the yoke B. Thereupon, the mechanic would preferably extract the arbor extension 40 and remove the spacer element 38, these elements being laid aside so that as demonstrated in FIGURES 11 and 12, manipulation of the device 20 into the position thereof shown, would be done with the other mechanism thereof having been relieved of all excess weight. Holding the thus stripped tool 20 via the knurled band 94 in one hand, with the lugs segments 92 lodged against the upper and lower arms $c$ and $d$ respectively of the yoke D, the handle bar 36 would be rotated with the other hand to bring the flange 104 into firm contact with the free end $e$ of the arm $a$ of yoke B.

At this point in the operation, the parts would be locked in the position thereof clearly shown in FIGURE 12. Thereupon the handle bar 36 would be further rotated clockwise, in consequence whereof the sleeve 26 would force the yoke D (and with it the spider E) rightwardly, thus to force the right hand bearing assembly $r$ approximately halfway out of the opening $h$ in the arm end portion $g$. The position of the various elements at this stage is demonstrated in FIGURE 13.

Inasmuch as at the FIGURE 13 stage in the operation, further rotation of the arbor via the handle bar requires great effort, the mechanic would rotate it in a counter-clockwise direction, thus causing the jaw member 28 to advance rightwardly a slight distance, whereupon the entire device 20 would be swung arcuately and taken from the joint, as should be apparent.

Next, the sleeve 26 would be manually pulled from its retaining engagement with the cup member flange 70 and laid aside. Thereupon, the arbor extension 40 would be pressed home into the socket 60 as shown in FIGURE 10, whereupon the jaw member 28 would be re-applied to the element $e$. The handle bar 36 would now be rotated in a clockwise direction, in consequence whereof the arbor extension 40 would be brought into engagement with the left hand bearing $r$ to first of all restore it to its normal position, and thereafter to force the spider E farther rightwardly with respect to the arm end portions $e$ and $g$. As a result, the right hand bearing $r$ would be forced to project further beyond the element $g$, as demonstrated in FIGURE 14.

Ordinarily at this stage, the operation would be complete. However, in a few universal joint structures currently in use, such as that selected for illustration herein, the spacer element 38 would be employed to effect the final step of pushing out the said right hand bearing assembly $r$.

Thus, following the FIGURE 14 disposition of the parts, the arbor 22 would be given a few counter-clockwise turns followed by removal of the mechanism for the insertion of the spacer 40 in the opening $f$. Thereupon, with the mechanism reapplied, the arbor would be rotated in a clockwise direction to advance the spider E farther rightwardly, until the right hand needle bearing assembly $r$ under consideration could be fully extracted by thumb and finger action, as should be apparent. The immediately preceding operations are believed to be readily understood from an inspection of FIGURES 15 and 16.

Assuming now that the removed bearing assembly $r$ appearing in FIGURE 16 had been washed with gasoline and lubricated in the customary manner, it would then be pressed into place in the manner demonstrated in FIGURE 17. It should be manifest that at the conclusion of this replacement operation, the joint A will have reverted to the status thereof illustrated in FIGURE 12. Wherefore the device 20 would next be reversed endwise to remove the opposite bearing assembly $r$ from the opening $f$ in the free end portion $e$ of the arm $a$.

It should be evident that the needle bearings disposed in the arms $c$ and $d$ of the yoke D would be removed and replaced in similar fashion. Should the operations be performed without removal of the propeller shaft assembly from the vehicle, the joint A would be rotated ninety degrees. Should the operations be performed with the propeller shaft assembly removed from the vehicle, the operations could be performed with the device 20 in vertical disposition.

In view of the foregoing description augmented by an inspection of the drawings that visibly demonstrate the operational action of the invention more clearly than a step by step description can, it is believed that an adequate presentation for a comprehensive understanding of my invention has been presented herein. It will of course be appreciated that the illustrated and described universal joint A represents what people in the automotive vehicle field consider a most difficult one with respect to bearing removal and replacement. Wherefore it will be understood that with respect to certain other universal joints, the precise steps recited in the operational explanation may be varied somewhat without departing from the principles and scope of my invention as defined in the claims hereunto appended.

What is claimed is:

1. A manually operable device for removing and replacing the needle bearing assemblies of a universal joint comprising in combination: an arbor including a cylindrical main body portion provided with peripheral threads, said main body merging at one end into a larger diametered collar portion and terminating at its opposite end in a reduced cylindrical segment; a diametrical circular opening through the collar portion; a cup member freely disposed about the arbor main body portion, said cup member including a cylindrical wall terminating at one end in an outwardly projecting circular flange having an annular flange projecting laterally therefrom; a spacer sleeve including a cylindrical main body portion having an arcuate extension integral therewith, said extension terminating in a pair of diametrically opposed lug segments; spring actuated ball detent means for releasably supporting said sleeve from the laterally projecting flange aforesaid of the cup member; a jaw member including a main body terminating at each end in an inwardly extending semicircular flange and having a similar intermediate flange, said intermediate flange defining with said end flanges a pair of semicircular recesses in said jaw member; a jaw actuating cylinder including a main body portion provided with internal threads in engagement with the peripheral threads aforesaid of the arbor main body and terminating at one end in a pair of spaced outstanding circular flanges; a compression spring controlled locking assembly releasably connecting said jaw member to said flanges of the actuating cylinder; a handle bar extending through the circular opening in the collar portion thereof whereby to rotate said arbor selectively in a clockwire or a counter-clockwise direction; an arbor extension; means for releasably retaining said extension in one of a pair of axial sockets each provided in one end portion of said arbor; a C-shaped spacer element; and resilient spring means for releasably retaining said spacer element on a reduced-in-diameter segment of the arbor between the collar portion thereof aforesaid and a circular flange constituting the outer end of said arbor.

2. A device for removing and replacing the needle bearing assemblies of a universal joint comprising in combination: the structure set forth in claim 1 wherein the cup member further includes an inwardly extending annular flange that defines therein a circular recess, and wherein a thrust bearing of the needle type is interposed about an unthreaded portion of the recited arbor main body and the adjacent face of the collar portion thereof.

3. In a device for removing and replacing needle bearing assemblies of universal joints of the type described, the combination including: an arbor; a cup member disposed thereabout and having a laterally projecting annular flange integral therewith; a spacer sleeve and means for removably retaining said sleeve in position on the flange aforesaid of the cup member; a jaw member of semicircular configuration adapted to be reciprocated by an actuating cylinder in response to rotary movements of said arbor; means for releasably locking said jaw member for concurrent movements therewith longitudinally of the device; handle bar means associated therewith for manually rotating said arbor in either a clockwise or a counter-clockwise direction; and an arbor extension releasably retainable in a seiectedo ne of a pair of sockets each provided in one end of the arbor; said arbor including a main body provided with peripheral threads in engagement with complemental internal threads in said actuating cylinder, said jaw actuating cylinder having a pair of axially spaced circular flanges integral therewith for the reception of one of a pair of semicircular end flanges of the jaw member, said jaw member having a semicircular intermediate flange that defines with said end flanges a pair of spaced semicircular cavities therein, one of said cavities being longitudinalwise wider than the other.

4. In a device of the character and for the purpose described, the combination of: a jaw member of semicircular configuration including inwardly extending end flanges each provided with a circular opening on an aligned plane, and an intermediate inwardly extending flange defining with said end flanges a pair of cavities for the reception of the free end portion of a universal joint yoke arm, the width extent of one of said cavities exceeding that of the other; a rotatable arbor including a threaded main body; a jaw reciprocating cylinder in threaded engagement with said main body of the arbor; a pair of axially spaced outstanding circular flanges on one end of the cylinder defining an annular peripheral groove for the reception of one end flange of the jaw member; a pair of aligned circular openings provided in said outstanding cylinder flanges, the diameters of said openings corresponding to those of the aligned openings in the end flanges of the jaw member; and a manually engageable assembly for releasably locking said jaw member to the cylinder for concurrent movement therewith, said assembly including a circular disc provided with a concentric central opening that freely surrounds the main body portion of said cylinder, a pin projecting laterally from one face of the disc and extending through the pair of aligned circular openings in the outstanding cylinder flanges and one of the similar openings in the jaw member end flanges, and a compression spring releasably maintaining said pin in the position aforesaid.

5. In a device for removinng and replacing the needle bearing assemblies of an automotive vehicle universal joint, the combination including: a rotatable arbor; a removable extension for the arbor; a jaw member for engaging a first yoke arm of the joint; a spacer sleeve having lugs thereon for engaging against a second yoke arm of the joint; an actuating cylinder and means for connecting the jaw member thereto; a rotatable arbor in threaded engagement with said cylinder; a cup member concentrically disposed about said arbor; an annular flange on the cup member; complemental detent means provided in said flange and the lug opposed end portion thereof for releasably supporting the spacer sleeve coaxially with said arbor, said jaw member and said cylinder; handle bar means for manually rotating said arbor; and a bearing assembly seated in a recess provided therefor in the cup member facilitating the rotation of said arbor, said bearing assembly being interposed in the recess about a portion of the arbor between an enlarged collar thereon and an inwardly extending annular flange of the cup member.

6. For incorporation in a device of the character and for the purpose described: an arbor including a main body provided with peripheral threads and merging near one end thereof into a larger diametered collar portion having a diametrical circular opening therein through which a elongated handle bar extends; a circular flange constituting one end of the arbor, the outer face of said flange being beveled; a reduced-in-diameter segment merging into the collar portion at one end and into said flange at the opposite end; a cylindrical collar segment of slightly reduced diameter relatively thereto constituting the other end of the arbor; and an axial circular socket formed in each end of said arbor for the releasable retention of an arbor extension, said extension comprising a plug having a rounded head integral with a shank having a diameter corresponding to those of said sockets.

7. For incorporation in a device of the character and for the purpose described: the elements set forth in claim 6, plus a spacer member of C-shaped configuration and means for releasably retaining said spacer on the arbor; said means comprising a resilient metallic split ring disposed about the reduced-in-diameter segment aforesaid between the end flange and the collar portion of the arbor, the internal diameter of said ring being slightly larger than the external diameter of said segment, the major internal periphery of the spacer element being formed on a radius that is slightly smaller than that defining the external diameter of said ring.

References Cited in the file of this patent

UNITED STATES PATENTS

| | | |
|---|---|---|
| 837,577 | Loud | Dec. 4, 1906 |
| 909,671 | Remelius | Jan. 12, 1909 |
| 984,978 | Straub | Feb. 21, 1911 |
| 1,411,082 | Gotsdanker | Mar. 28, 1922 |
| 1,873,250 | Adolph | Aug. 23, 1932 |
| 2,216,878 | Densmore | Oct. 8, 1940 |